United States Patent [19]

Sullivan et al.

[11] Patent Number: 4,567,343

[45] Date of Patent: Jan. 28, 1986

[54] WELDING TORCH WITH DUAL GAS SHIELDING

[75] Inventors: Eric C. Sullivan; Daniel W. Allford, both of Houston, Tex.

[73] Assignee: Hughes Tool Company - USA, Houston, Tex.

[21] Appl. No.: 710,000

[22] Filed: Mar. 13, 1985

Related U.S. Application Data

[63] Continuation-in-part of Ser. No. 607,091, May 4, 1984, abandoned.

[51] Int. Cl.[4] ............................................. B23K 9/16
[52] U.S. Cl. ................................... 219/74; 219/137.42
[58] Field of Search ........... 219/137.42, 137.8, 137.44, 219/137.31, 74

[56] References Cited

U.S. PATENT DOCUMENTS

| | | | |
|---|---|---|---|
| 1,098,119 | 5/1914 | Kongsbak | 431/268 |
| 1,755,882 | 4/1930 | Krebs | 228/25 |
| 1,925,656 | 9/1933 | Duitz | 228/244 |
| 1,981,624 | 11/1934 | Kehl | 228/53 |
| 2,356,048 | 8/1944 | Goddeau | 239/553.3 |
| 2,570,386 | 10/1951 | Scheller | 266/51 |
| 2,859,328 | 11/1958 | Sohn | 219/74 |
| 3,803,381 | 4/1974 | Bernard et al. | 219/137.42 |
| 4,254,322 | 3/1981 | Asano | 219/137.8 X |

FOREIGN PATENT DOCUMENTS 85678  5/1982  Japan ............................ 219/137.42

Primary Examiner—C. L. Albritton
Assistant Examiner—Alfred S. Keve
Attorney, Agent, or Firm—Robert A. Felsman; Charles D. Gunter, Jr.

[57] ABSTRACT

A welding torch is shown with a dual shield gas flow for preventing flux buildup on the weld area for welds in confined spaces. The torch has a wire conduit for receiving an advancing supply of welding wire. The wire conduit has a curved end portion for guiding the welding wire toward the weld area and has an opening through which the welding wire extends for welding. A primary gas conduit directs the flow of primary shield gas and has an open, gas dispensing end adjacent the wire conduit opening. A secondary shield gas source located rearward of the gas dispensing end directs the flow of secondary shield gas in the direction of the weld area. The secondary shield gas flow is arranged to surround the primary gas flow in the direction of the weld. The orientation of the primary gas exiting the primary gas conduit induces the flow of secondary gas to change direction to provide additional gas shielding for the weld area.

7 Claims, 4 Drawing Figures

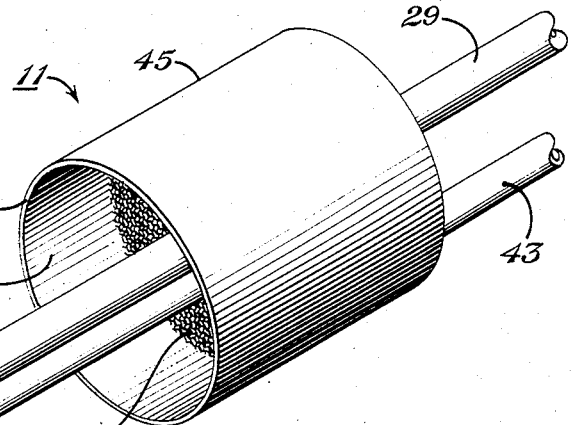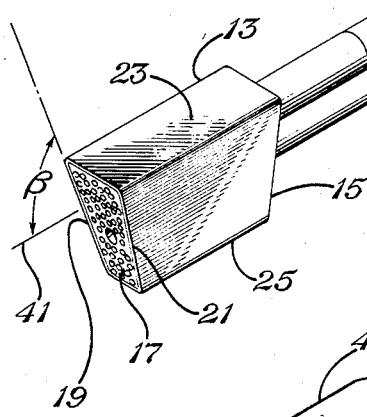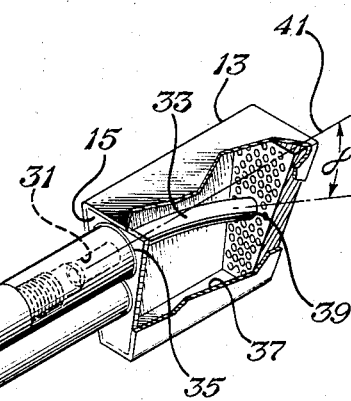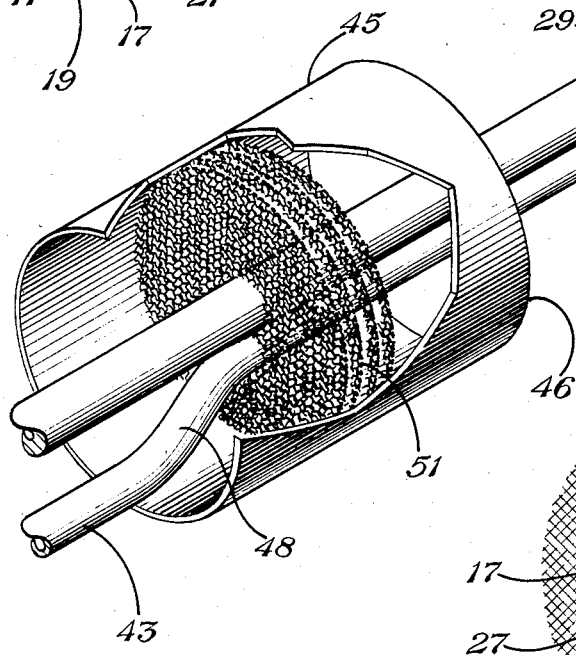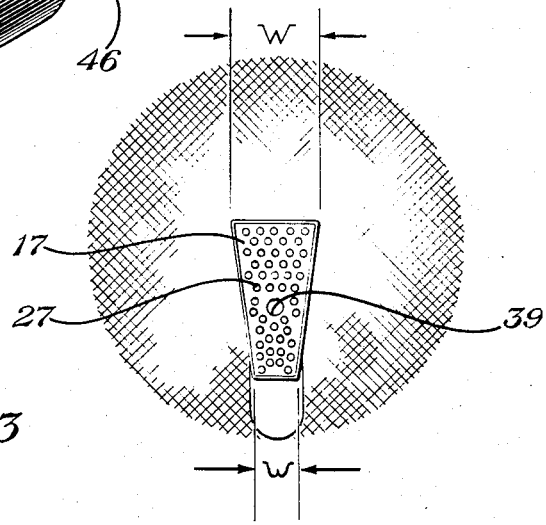

WELDING TORCH WITH DUAL GAS SHIELDING

This application is a continuation-in-part, of application Ser. No. 607,091, filed May 4, 1984, now abandoned.

BACKGROUND OF THE INVENTION

1. Field of the Invention:

The present invention relates, generally, to welding torches used for gas-shielded metal arc welding and, specifically, to such a torch which incorporates dual shielding gas systems for improved protection of the weld area from atmosphere contamination and oxidation.

2. Description of the Prior Art:

In some electric arc welding processes, such as shielded metal arc (SMA) welding and gas metal arc (GMA) welding, filler metal is transferred from a consumable electrode, across the arc, to the weld puddle. In contrast, nonconsumable electrode processes, such as gas tungsten arc (GTA) welding, rely upon an auxiliary feed system to present filler metals to the weld. The filler metal is generally not transferred across the arc. The deposition rates and welding speeds for processes of the latter type are frequently inferior to the consumable electrode techniques.

During certain welding processes, such as in SMA welding, for example, atmospheric contaminants are excluded from the weld puddle by shielding gases and slag systems formed when a coaxial electrode coating decomposes. Because of the coaxial design of the electrodes, adequate shielding can usually be provided wherever the electrode can be inserted and manipulated.

In GMA welding, the torch is designed to carry and direct a consumable wire electrode and a shielding gas to the puddle area. The torch's size limits its usefulness in making weldments in confined areas.

There exists, therefore, a need for a GMA welding torch which can be used in difficult-to-reach locations which adequately shields the weld.

SUMMARY OF THE INVENTION

A welding torch is shown with improved gas shielding to prevent atmospheric contamination or oxidation of the weld area for welds in confined spaces. The torch includes a wire conduit which is adapted to receive an advancing supply of welding wire. An adjacent primary gas conduit, associated with the wire conduit, directs the flow of a primary shield gas. A secondary shield gas means is provided for directing the flow of a secondary shield gas. The flow from the secondary shield gas means is arranged to surround the flow of the primary gas conduit in the direction of the weld area so that the primary gas flow extends from within the secondary gas flow. The primary gas conduit and wire conduit are appropriately oriented so that the flow of the primary shield gas induces the flow of the secondary shield gas to change direction and provide dual flow gas shielding of the weld area.

Additional objects, features and advantages will be apparent in the written description which follows.

BRIEF DESCRIPTION OF THE DRAWINGS

FIG. 1 is a perspective view of the welding torch of the invention.

FIG. 2 is a side perspective view of the welding torch of FIG. 1 from the opposite end with portions of the torch shown broken away.

FIG. 3 is a front view of the diffusing wall and secondary gas conduit of the welding torch of FIG. 1.

DETAILED DESCRIPTION OF THE INVENTION

Figure 4:
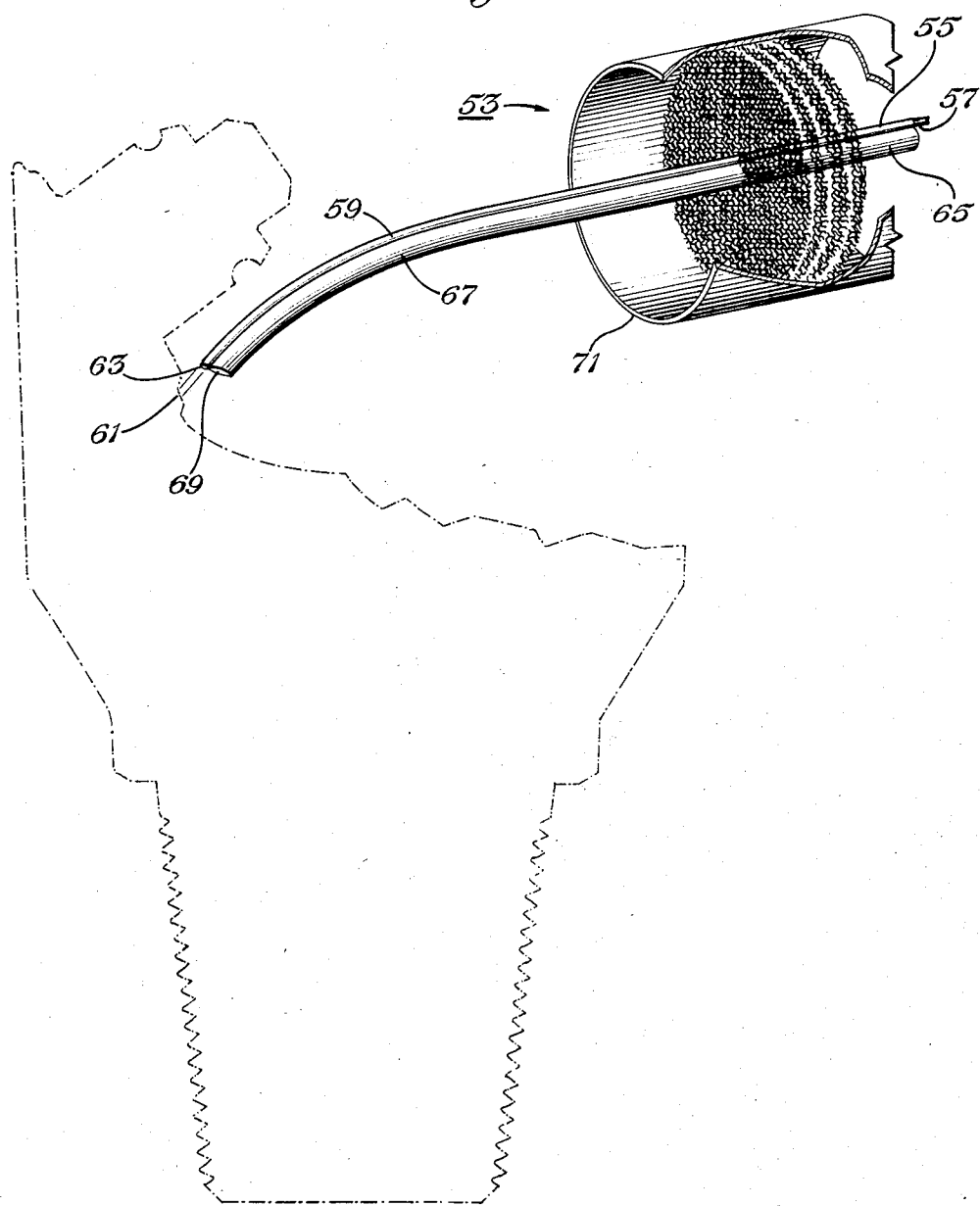
FIG. 4 is another embodiment of the welding torch of the invention similar to FIG. 2.

Turning to FIG. 1 there is shown a welding torch of the invention designated generally as 11. The welding torch of the invention has a primary gas chamber 13 having a rear end wall 15, a front diffusing wall 17, left and right sidewalls 19, 21 and top and bottom walls 23, 25. As shown in FIG. 3, the front diffusing wall 17 is a generally trapezoidal shaped surface having a plurality of holes or apertures 27 drilled therein. The diffusing wall 17 can be of steel sheet with the thickness thereof being preferably about twice the average hole diameter of the holes 27. The primary gas chamber 13 has a cross section designed to take advantage of weld groove space in confined areas. In the embodiment shown in FIG. 3, the width "W" of the wall 17 at the top thereof is approximately twice the width "w" at the juncture with the bottom wall 25.

A tubular wire conduit 29 having an interior bore 31 is connected to the gas chamber rear end wall 15 and is adapted to receive a continuously advanced supply of welding wire (not shown). As shown in FIG. 2, the wire conduit 29 has a curved end region 33 which extends from the bore 31 adjacent the juncture 35 with the gas chamber 13. The curved end region 33 is of reduced external diameter with respect to wire conduit 29 and extends through the interior 37 of the gas chamber 13 to terminate in an opening 39 in the diffusing wall 17. The wire opening 39, as shown in FIG. 3, is of greater relative diameter than the remaining holes 27. As shown in FIG. 2, the curved end region 33 of the wire conduit 29 forms an angle alpha with respect to the longitudinal axis 41 of the remaining tubular wire conduit 29, whereby the wire being advanced through the tubular wire conduit 29 is forced to change direction so that the welding wire is provided to the weld area at an optimum welding angle.

A primary gas conduit 43 is connected to the rear end wall 15 of the primary gas chamber 13 for supplying pressurized gas from any convenient gas source (not shown) to the gas chamber. As shown in FIG. 3, the primary pressurized gas passed through the diffusing wall 17 and around the wire conduit end opening 39 to shield the welding wire during the welding operation. The conventional shielding gas used is known to those skilled in the art and can be, for instance, about 75% argon and 25% carbon dioxide. As shown in FIG. 1, the front diffusing wall 17 is inclined at an acute angle beta with respect to the longitudinal axis 41 of the wire conduit 29 in order to change the direction of flow of the primary shield gas from the direction of the gas upon entering the chamber interior 37.

A cylindrically shaped secondary shield gas conduit 45 is arranged coaxial with the tubular wire conduit 29 and the primary gs conduit 43 and is positioned rearward of the gas chamber 13 for supplying pressurized gas in the direction of the weld area. As shown in FIG. 3, the secondary gas conduit 45 has an internal diameter which is about twice the height of the primary gas chamber diffusing wall 17. The secondary gas conduit 45 has an interior bore 47 (FIG. 1) and an open pipe end 49 with the primary gas conduit 43 and wire conduit 29 being arranged to pass through the pipe bore 47 and extend outwardly from the pipe open end 49. A secondary shield gas is supplied from a suitable source (not shown) through the interior pipe bore and through a series of mesh stainless steel screens or "gas lenses" 51 of the type known in the art. The screens 51 are preferably inserted ahead of the primary conduit bend 48 from the leading end 46 of the secondary gas conduit 45.

In the operation of the invention, the secondary shield gas passes out the open pipe end 49 in the direction of the primary gas chamber rear wall 15. Since the internal diameter of the secondary pipe bore 47 is greater than the height and width, respectively, of the primary gas chamber 13, the secondary gas flow circumscribes the primary gas flow passing out the diffusing wall 17. Due in part to the difference in diameters of the primary and secondary gas conduits, the primary shield gas passing through the diffusing wall 17 is directed at a higher relative velocity than the gas passing through the larger diameter secondary gas conduit bore 47. As a result, the primary shield gas induces a change in direction of the secondary shield gas in the direction indicated as angle alpha in FIG. 2 to further shield the weld by inducing additional gas coverage from the tangential gas stream from the secondary gas conduit 45.

Another embodiment of the welding torch of the invention is designated generally as 53 in FIG. 4. The torch 53 includes a wire conduit 55 adapted to receive an advancing supply of welding wire 57. The wire conduit 55 has a gently curved end portion 59 for guiding the welding wire 57 toward a weld area 61, for instance, in a confined space on a rock bit of the type used in earth boring operations (indicated in dotted lines in FIG. 4). The wire conduit 55 also has an opening 63 through which the welding wire 57 extends for welding.

A primary gas conduit 65 is associated with the wire conduit 55 and has a curved end region 67 which follows the curvature of the wire conduit end portion 59 for directing the flow of a primary shield gas. The primary gas conduit 65 terminates at an open, gas dispensing end 69 adjacent the wire conduit opening 63 whereby the primary shield gas exiting the primary gas conduit 65 shields the welding wire 57 and weld area 61.

In the embodiment shown in FIG. 4, the wire conduit 55 and the primary gas conduit 65 are a brazed assembly consisting of two radiussed copper tubes. The wire conduit 55 is approximately ½" in diameter and the primary gas conduit 65 is approximately ⅜" in diameter. Since both the primary gas conduits 65 and the wire conduit 55 are electrically 'hot', a ceramic (alumina) over nickel coating is applied to the brazed assembly to prevent arcing when working in confined areas. The coating also minimizes weld splatter and tend to thermally insulate the torch to protect it from the welding heat. Although a ceramic over nickel coating was used in the embodiment described, any non-metallic coating could be used which is not electrically conductive and which preferably, affords some thermal resistance to protect the torch from the welding heat.

A secondary shield gas means 71 is provided, as before, for directing the flow of a secondary shield gas. The secondary shield gas means 71 is arranged to provide a secondary shield gas flow in the direction of the weld area 61 with the primary shield gas flow extending from within the secondary gas flow. The orientation of the primary gas exiting the primary gas conduit end 69 induces the flow of secondary shield gas to change direction to focus the total gas flow on the weld area 61 and provide additional gas shielding of the weld area.

An invention has been provided with significant advantages. The primary gas conduit of the torch of the invention has a gas dispensing end which is spaced-apart from the larger diameter, cylindrically-shaped secondary gas shield conduit by a distance sufficient to allow the torch to access confined spaces. The curved end portion of the wire conduit provides the welding wire at an improved welding angle. Atmospheric contamination, or oxidation of the weld area is prevented by orienting the primary gas conduit and associated wire conduit to provide shield gas in the direction of the weld area. The secondary gas source is diverted at an angle toward the weld area to adequately shield the weld. By using the relatively high velocity primary gas flow to pinpoint or target the secondary shield gas flow, adequate gas shielding is provided for welds in confined areas.

While the invention has been shown in only two of its forms, it is not thus limited but is susceptible to various changes and modifications without departing from the spirit thereof.

We claim:

1. A welding torch with improved gas shielding to prevent atmospheric contamination or oxidation of the weld area for welds in confined spaces comprising:

a primary gas chamber having a diffusing wall therein;

a wire conduit adapted to receive a continuously advanced supply of welding wire, said wire conduit having an end portion mounted within said diffusing wall at an angle to the axis of said wire being advanced through said wire conduit to thereby change the direction of said welding wire being advanced through said wire conduit;

a primary gas conduit connected to said primary gas chamber for supplying pressurized gas to said chamber, said primary pressurized gas passing through said diffusing wall around said wire conduit to shield said welding wire during welding;

secondary shield gas means for supplying pressurized gas in the direction of said weld, said primary gas conduit being arranged to extend from within the direction of flow of said secondary shield gas means so that the flow of the secondary shield gas surrounds the flow of the primary shield gas and the flow of primary shield gas induces a change in direction in the flow of the secondary shield gas to further shield the weld area.

2. A welding torch with improved gas shielding to prevent atmospheric contamination or oxidation of the weld area for welds in confined spaces comprising:

a primary gas chamber having a rear end wall and a front diffusing wall therein;

a tubular wire conduit having an interior bore adapted to receive a continuously advanced supply of welding wire, said tubular wire conduit having a curved end region of reduced external diameter with an end portion mounted within said diffusing wall at an angle to the axis of said remaining tubular wire conduit to thereby change the direction of said welding wire being advanced through said tubular wire conduit;

a primary gas conduit connected to said rear end wall of said primary gas chamber for supplying pressurized gas to said chamber, said primary pressurized gas passing through said diffusing wall around said wire conduit to shield said welding wire during welding;

a cylindrically shaped, secondary shield gas conduit arranged coaxial with said tubular wire conduit and said primary gas conduit and positioned rearward of said primary gas chamber for supplying pressurized gas in the direction of said weld, said primary gas conduit being arranged to extend from within the direction of flow of said secondary shield gas conduit so that the flow of the secondary shield gas surrounds the flow of the primary shield gas and the flow of primary shield gas induces a change in direction in the flow of the secondary shield gas to further shield the weld.

3. The welding torch of claim 2, wherein said primary gas chamber is a box shaped member having a height, a width and a thickness and said secondary shield gas conduit is a cylindrically shaped pipe having an interior pipe bore and an open pipe end, said primary gas conduit and said tubular wire conduit being arranged to pass through said pipe bore and extend outwardly from said pipe open end, and wherein the internal diameter of said pipe bore is greater than the height and width, respectively, of said primary gas chamber.

4. The welding torch of claim 3, wherein said secondary shield gas is supplied from a shield gas source through the interior pipe bore and out the open pipe end thereof in the direction of said primary gas chamber.

5. The welding torch of claim 4, wherein said primary gas chamber diffusing wall is arranged at an acute angle with respect to the longitudinal axis of the wire conduit for changing the direction of flow of said primary shield gas entering said chamber.

6. A method of welding a weld area in a confined space comprising the steps of:

passing a supply of welding wire through a wire conduit, the welding wire passing out an open end of the wire conduit in the vicinity of the weld area;

directing a primary shield gas through a primary gas conduit, the primary as conduit being arranged so that the primary shield gas passes around said welding wire to shield said welding area;

directing a secondary shield gas through a secondary shield gas conduit located rearward of the direction of flow of said primary shield gas, said primary gas conduit being arranged to extend from within the direction of flow of said secondary shield gas so that the flow of the secondary shield gas surrounds the flow of the primary shield gas; and altering the direction of flow of said primary shield gas so that the flow of the primary shield gas induces a change in the direction of flow of the secondary shield gas to further shield the weld area.

7. The method of claim 6, wherein said primary shield gas is supplied at a greater relative velocity than said secondary shield gas, whereby said primary shield gas diverts a portion of said secondary shield gas at an angle toward said weld area to adequately shield the weld.

* * * * *